(12) United States Patent
Nigel et al.

(10) Patent No.: US 8,789,873 B2
(45) Date of Patent: Jul. 29, 2014

(54) VEHICLE DOOR SYSTEMS

(75) Inventors: Dean Nigel, Stratford Upon Avon (GB);
Robin Warmington, Oxford (GB);
Henry Bain, Conventry (GB)

(73) Assignee: Land Rover (GB)

(*) Notice: Subject to any disclaimer, the term of this patent is extended or adjusted under 35 U.S.C. 154(b) by 685 days.

(21) Appl. No.: 13/002,241

(22) PCT Filed: Jul. 1, 2009

(86) PCT No.: PCT/IB2009/052867
§ 371 (c)(1),
(2), (4) Date: Mar. 29, 2011

(87) PCT Pub. No.: WO2010/001350
PCT Pub. Date: Jan. 7, 2010

(65) Prior Publication Data
US 2011/0169297 A1   Jul. 14, 2011

(51) Int. Cl.
*E05F 5/06* (2006.01)
*E05C 17/20* (2006.01)
*B60J 10/08* (2006.01)

(52) U.S. Cl.
CPC ............ *E05F 5/06* (2013.01); *E05C 17/203* (2013.01); *B60J 10/08* (2013.01); *Y10S 292/15* (2013.01)
USPC . 296/146.9; 296/154; 292/262; 292/DIG. 15; 16/82

(58) Field of Classification Search
USPC .......... 296/146.1, 146.5, 146.9, 146.11, 149, 296/154; 292/1, DIG. 15, 262, 265, 268; 16/82, 86 C
See application file for complete search history.

(56) References Cited

U.S. PATENT DOCUMENTS

| 6,145,163 | A | 11/2000 | Mitchell et al. |
| 7,703,816 | B2* | 4/2010 | Kitayama et al. ............. 292/262 |
| 2003/0173786 | A1 | 9/2003 | Miyagawa et al. |
| 2007/0040392 | A1 | 2/2007 | Matsuki |
| 2007/0241569 | A1* | 10/2007 | Kitayama et al. ............. 292/262 |
| 2009/0072552 | A1* | 3/2009 | Kitayama et al. ............. 292/262 |

FOREIGN PATENT DOCUMENTS

DE         9102140 U1    5/1991
WO     WO-0214637 A1    2/2002

* cited by examiner

*Primary Examiner* — Glenn Dayoan
*Assistant Examiner* — Jason S Daniels
(74) *Attorney, Agent, or Firm* — Rader, Fishman & Grauer PLLC

(57) ABSTRACT

A vehicle door system comprises: a door (16) formed from a plurality of panels (18, 20) which define a door cavity (22), one of the panels (20) having an aperture (44) therein at a hinged end of the door; and a check mechanism. The check mechanism comprises a check arm housing (40) mounted within the door cavity (22) and a check arm (42) connected to the vehicle body and extending through the aperture (44) and through the check arm housing (40). The check arm (42) is movable through the check arm housing (40) to allow opening and closing of the door (16). The check arm (42) has a flow restrictor formed on it arranged to restrict the flow of water along the check arm through the aperture.

11 Claims, 3 Drawing Sheets

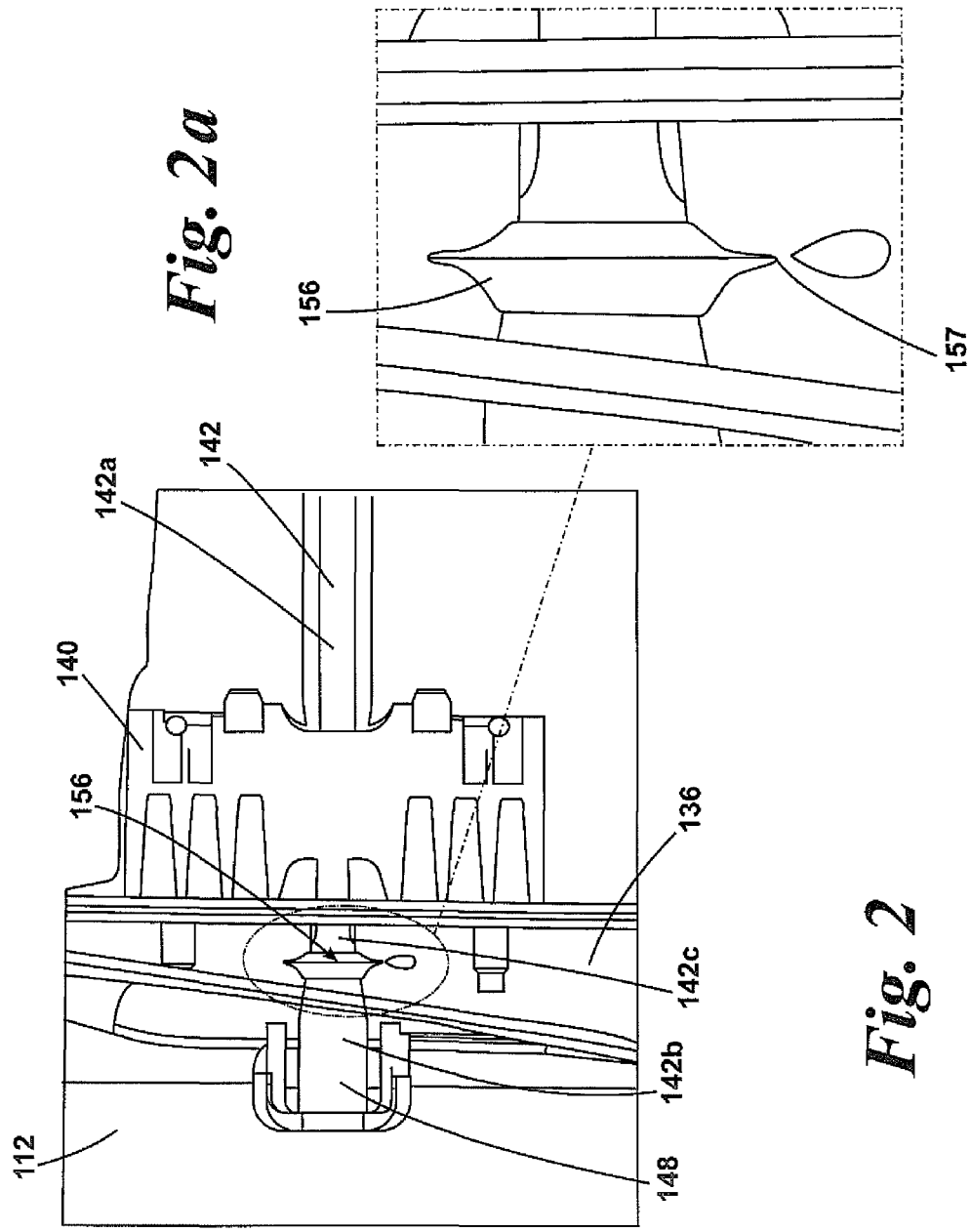
Fig. 2a
Fig. 2

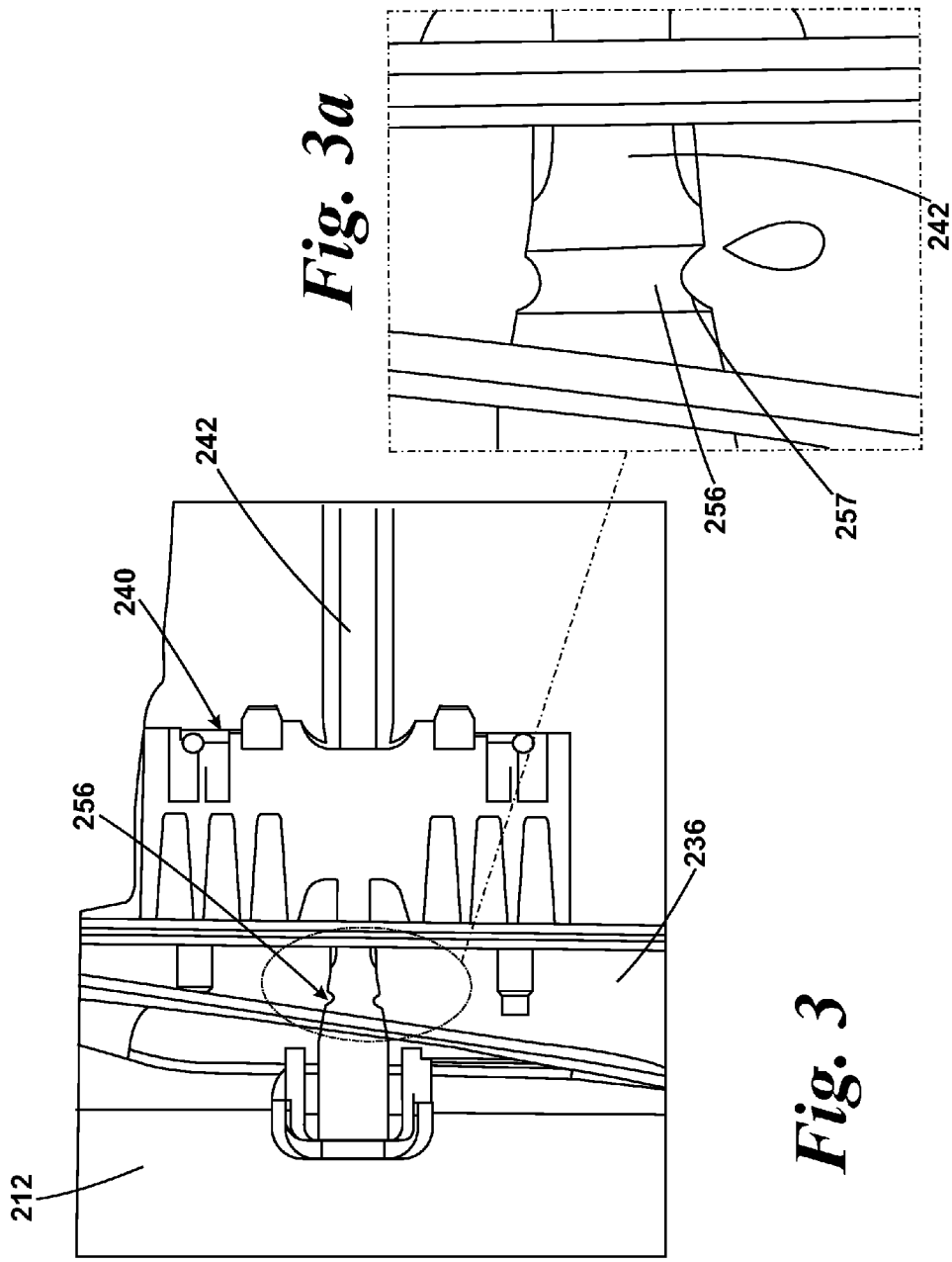

VEHICLE DOOR SYSTEMS

CROSS-REFERENCES TO RELATED APPLICATION

This application claims priority to United Kingdom patent application GB 0811969.5 filed on Jul. 1, 2008, and International Patent Application PCT/IB2009/052867 filed on Jul. 1, 2009, both of which are hereby incorporated by reference in their entirety.

The present invention relates to vehicle doors and in particular to the management of water flow in vehicle door systems.

The present invention provides a vehicle door system comprising: a door, which may be formed from a plurality of panels which define a door cavity. One of the panels may have an aperture therein at a hinged end of the door. The system may further comprise a check mechanism comprising a check arm housing mounted within the door cavity and a check arm connected to the door and optionally extending through the aperture and through the check arm housing. The check arm may be movable through the check arm housing to allow opening and closing of the door. The check arm has flow restriction means formed on it arranged to restrict the flow of water along the check arm, and optionally through the aperture.

The invention will now be described by way of example with reference to the accompanying drawings of which:—

FIG. 2 is a side view of part of a vehicle door system according to a further embodiment of the invention;

FIG. 2a is an enlargement of part of FIG. 2;

FIG. 3 is a side view of part of a vehicle door assembly according to a further embodiment of the invention; and FIG. 3a is an enlargement of part of FIG. 3.

Figure 1:
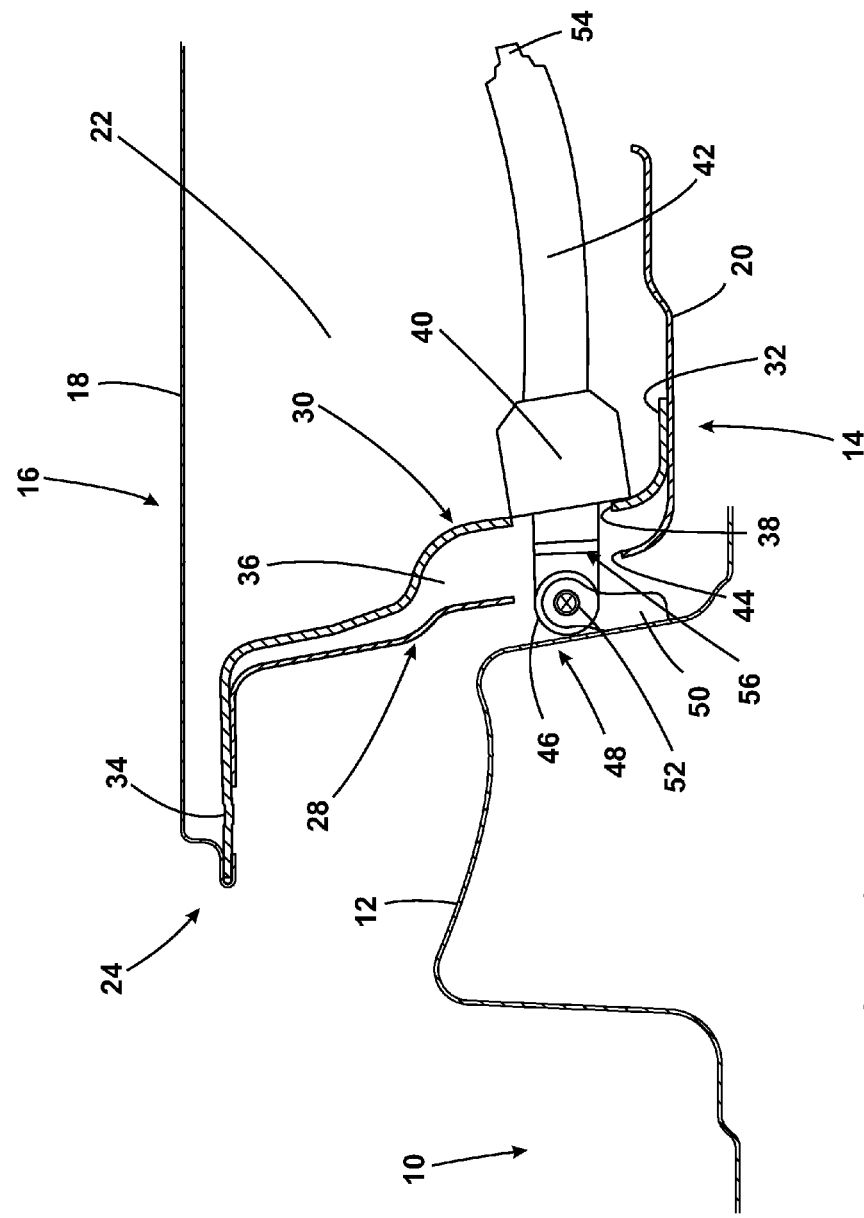
FIG. 1 is a horizontal section through part of a vehicle door system according to an embodiment of the invention.

Referring to FIG. 1, a vehicle body 10 includes a vertical structural post 12 on the front side of a door aperture 14, and a vehicle door 16 is hingedly mounted on the post 12 by hinges (not shown) so that it can be opened and closed. The door comprises an outer panel 18 and an inner panel 20 defining between them a door cavity 22. At the front edge 24 of the door the front edge of the inner door panel 20 is bent round so as to extend approximately perpendicular to the main plane of the door. The front edge of the inner door panel therefore forms an end wall 28 covering the front end of the door cavity 22.

A reinforcing panel 30 is provided inside the door cavity 22 and extends across the door cavity 22 approximately parallel to the end wall 28, being attached to the inner panel 20 at its inside edge 32, and forming part of a join between the inner and outer panels 20, 18 at its outside edge 34. The reinforcing panel 30 is spaced from the end wall 28 so that a cavity 36 is formed between them.

The reinforcing panel 30 has an aperture 38 through it and a check arm housing 40 is mounted in the door cavity 22 on the inside of the reinforcing panel 30, extending over the aperture 38. A check arm 42 extends through the check arm housing 40 and the aperture 38, and also through an aperture 44 in the end wall 28, and has a first end 46 pivotably connected to the post 12 by a mounting 48 which comprises a bracket 50 and a pivot pin 52. The check arm housing 40 supports a rotatable slider (not shown) through which the check arm 42 can slide as the door 16 is opened and closed, and the check arm 42 has a stop 54 at its second end which engages with the check arm housing 40 when the door is in its fully open position to limit opening of the door 16. The check arm 42 extends across the gap between the door 16 and the post 12, through the aperture 44 in the door end wall 28, across the cavity 36 between the end wall 28 and reinforcing panel 30, through the aperture 38 in the reinforcing panel, and through the check arm housing 40. When the door 16 is closed, as shown in FIG. 1, the second end and most of the length of the check arm 42 is within the door cavity 22.

The check arm 42 includes a water flow restrictor 56 which is in the form of a pair of narrow ridges extending across the top and bottom surfaces of the check arm 42. The ridges extend across the full width of the check arm 42 and are spaced from the pivot axis of the mounting 48 by a distance which is greater than the distance between that pivot axis and the end wall 28 when the door is closed, and less than the distance between that pivot axis and the check arm housing 40 when the door is closed. Therefore, when the door is closed, the water flow restrictor is located within the door cavity 22, and in this case within the cavity 36 between the door end wall 28 and the reinforcing panel 30.

In use, when the door 16 is closed, water running down inside the door 16 can be caught on the check arm 42 and may start to flow along the check arm 42 towards the aperture 44 in the front end of the door 16. Any water that reaches the flow restrictor 56 will be prevented from flowing any further, and will tend to drop off the check arm 42 down inside the door cavity 22, and in this case inside the cavity 36 between the reinforcing panel 30 and the door end wall 28. This water therefore follows the path of the rest of the water inside the door cavity 22, and it will reach the bottom of the door 16 where drainage holes are provided, arranged to allow the water to drain out. The flow of water along the check arm 42 into the gap between the door 16 and the vehicle body, specifically the post 12, is therefore restricted or substantially prevented. The advantage of this is that the pivoted end 46 of the check arm 42 is generally between the inner and outer door seals, so water running down from the pivoted end 46 of the check arm can get trapped on the door sill between the inner and outer door seals. However the drainage holes in the bottom of the door are arranged to drain the water outside the outer door seal, and therefore water diverted off the check arm 42 by the flow restrictor 56 will not be trapped on the door sill.

Referring to FIGS. 2 and 2a, in a second embodiment of the invention, features corresponding to those in the first embodiment are indicated by the same reference numerals increased by 100. In this case the check arm 142 comprises a main sliding portion 142a of constant cross section arranged to slide through the check arm housing 140, and a mounting portion 142b at the pivoted end of the check arm 142. The flow restrictor 156 is located on an intermediate section 142c of the check arm 142 which is narrower than the mounting portion 142b, and tapered, getting narrower in the direction away from the mounting 148. The flow restrictor 156 comprises a ridge which extends all around the check arm 142 and is formed of plastics material and over-moulded onto the check arm 142. In this case a sharp edge 157 at the top of the ridge 156 is arranged to encourage water to collect together and drop from the lowest point of the ridge 156.

Referring to FIGS. 3 and 3a, in a third embodiment of the invention, features corresponding to those in the first embodiment are indicated by the same reference numerals increased by 200. In this case, the flow restrictor comprises a recessed part 256 of the check arm 242. This is formed by a groove or channel 257 formed in the surface of the check arm 242, which again extends all around the check arm 242. In this case, the check arm 242 is tapered slightly, getting wider towards the outer end, in the region of the groove 257. Therefore water flowing along the check arm will tend to flow round to the underside of the check arm 242 before it reaches the groove 257. On reaching the groove 257 on the underside, the water will not flow up into the groove 257 and will tend to drop off the arm at the edge of the groove 257.

It will be appreciated that various modifications can be made to the embodiments described above. For example, in cases where there is not a separate reinforcing panel, and the check arm housing is mounted on the inside of the end wall of the door, the underside of the check arm housing can have an aperture formed in it. The flow restrictor can then be arranged to be located over that aperture when the door is closed. In this way the flow restrictor can still be located within the door cavity and spaced from the front end wall of the door cavity, so that water is diverted to flow from the check arm down inside the door cavity, and also be spaced from the rotatable slider in the check arm housing. Alternatively the check arm housing can be mounted on the end wall by means of a mounting bracket which provides the required spacing.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. A vehicle door system comprising:
   a door formed from a plurality of panels which define a door cavity, one of the panels having an aperture therein at a hinged end of the door; and
   a check mechanism comprising:
      a check arm housing mounted within the door cavity and spaced from the aperture; and
      a check arm arranged for connection to a vehicle body and extending through the aperture and through the check arm housing, and being movable through the check arm housing to allow opening and closing of the door;
   wherein the check arm has a flow restriction mechanism formed on it arranged to restrict the flow of water along the check arm through the aperture, the flow restriction mechanism being located between the aperture and the check arm housing when the door is closed;
   wherein the door includes a support member on which the check arm housing is supported, the support member having a support panel spaced from the aperture and having a further aperture through which the check arm extends.

2. A vehicle door system according to claim 1 wherein the flow restriction mechanism comprises a ridge extending across the check arm.

3. A vehicle door system according to claim 2 wherein the ridge projects outwards from the check arm.

4. A vehicle door system according to claim 1 wherein the flow restriction mechanism comprises a recess extending across the check arm.

5. A vehicle door system according to claim 1 wherein the flow restriction mechanism extends completely around the check arm.

6. A check arm for a vehicle door system having a check arm housing, the check arm comprising:
   a mounting mechanism at a first end for pivotably mounting the check arm on a vehicle body;
   a stop at a second end arranged to limit opening of a vehicle door;
   a sliding portion arranged to slide through the check arm housing, the sliding portion having a substantially constant cross section; and
   a flow restriction mechanism arranged to restrict the flow of water along the check arm.

7. A check arm according to claim 6 further comprising a mounting portion having the mounting mechanism thereon, the flow restriction mechanism being located between the sliding portion and the mounting portion.

8. A check arm according to claim 7 wherein the flow restriction mechanism comprises a ridge extending across the check arm.

9. A check arm according to claim 8 wherein the ridge projects outwards from the check arm.

10. A check arm according to claim 7 wherein the flow restriction mechanism comprises a recess extending across the check arm.

11. A check arm according to claim 7 wherein the flow restriction mechanism extends completely around the check arm.

* * * * *